United States Patent [19]

Check, Jr.

[11] Patent Number: 4,566,106

[45] Date of Patent: Jan. 21, 1986

[54] ELECTRONIC POSTAGE METER HAVING REDUNDANT MEMORY

[75] Inventor: Frank T. Check, Jr., Orange, Conn.

[73] Assignee: Pitney Bowes Inc., Stamford, Conn.

[21] Appl. No.: 723,001

[22] Filed: Apr. 15, 1985

Related U.S. Application Data

[63] Continuation of Ser. No. 343,877, Jan. 29, 1982, abandoned.

[51] Int. Cl.[4] .......... G06F 11/30

[52] U.S. Cl. .......... 371/67; 371/21

[58] Field of Search .......... 371/20, 21, 67, 10; 364/464, 200, 900

[56] References Cited

U.S. PATENT DOCUMENTS

| | | | |
|---|---|---|---|
| 3,311,890 | 3/1967 | Waaben | 371/21 |
| 3,544,777 | 12/1970 | Winkler | 371/10 |
| 3,938,095 | 8/1976 | Check, Jr. et al. | 364/200 |
| 3,978,457 | 8/1976 | Check et al. | 364/200 |
| 4,093,999 | 6/1978 | Fuller et al. | 364/900 |
| 4,301,507 | 11/1981 | Soderberg et al. | 364/704 |
| 4,313,200 | 1/1982 | Nishiura | 371/20 |
| 4,422,140 | 12/1983 | Keats | 371/20 |

FOREIGN PATENT DOCUMENTS

| | | |
|---|---|---|
| 80400603.9 | 5/1980 | European Pat. Off. . |
| 0026734 | 9/1980 | European Pat. Off. . |
| 3024370 | 1/1982 | Fed. Rep. of Germany . |
| 2079233A | 1/1982 | United Kingdom . |

OTHER PUBLICATIONS

Hackl et al., "Dynamic Allocation of High Availability Storage," IBM Technical Information Bulletin, vol. 10, No. 10, (Mar. 1968).

Chamoff et al., "Nonvolatile Totals Implementation," IBM Technical Information Bulletin, vol. 20, No. 10, (Mar. 1978).

Katsuki et al., "Pluribus-An Optional Fault-Tolerant Multiprocessor," Proceedings of the IEEE, vol. 66, No. 10, (Oct. 1978).

Szygenda et al., "Self-Diagnosis and Self-Repair in Memory: An Integrated System Approach," IEEE Transactions on Reliability, vol. R-22, No. 1, (Apr. 1973).

Depledge, "Fault-Tolerant Computer Systems," IEEE Proceedings-A, vol. 128, No. 4, (May 1981).

Irwin, J. W., "Microprocessor Error Layout" IBM Technical Disclosure Bulletin, vol. 18, No. 4, Sep. 75.

*Primary Examiner*—Michael R. Fleming
*Attorney, Agent, or Firm*—David E. Pitchenik; William D. Soltow, Jr.; Albert W. Scribner

[57] ABSTRACT

An electronic postal meter has an accounting unit with redundant nonvolatile random access memories controlled by a microprocessor system. The redundant random access memories have separate groups of address and data lines to minimize identical errors in data stored therein. The data transfer may occur at different times to and from the memories, with respect to any given byte of data. The system may incorporate redundant microprocessors, and critical parameters may be checked at periodic intervals in the main program of the accounting microprocessor system.

8 Claims, 6 Drawing Figures

ELECTRONIC POSTAGE METER HAVING REDUNDANT MEMORY

This application is a continuation of application Ser. No. 343,877, filed Jan. 29, 1982, now abandoned.

FIELD OF THE INVENTION

This invention relates to electronic accounting systems, and is especially directed to an electronic postage meter having a microprocessor controlled electronic accounting unit with nonvolatile random access memory.

DESCRIPTION OF THE PRIOR ART

An electronic postage meter having an accounting unit with a microprocessor, and nonvolatile memory for storing accounting data, is disclosed, for example, in U.S. Pat. No. 4,301,507 which is assigned to the assignee of the present application. In this system the accounting data is stored in the random access memory and retrieved from the random access memory by way of common address and data lines of the microcomputer system. While in most instances it can be assured that the accounting data stored in the memory will be correct, there are certain conditions that can occur that can result in nondetectable errors in the data.

In order to overcome such problems, it has been proposed to employ redundant memories. The microprocessor program for the postal meter thus includes a subroutine for comparing the data stored in the redundant memories, to provide an error indication if the stored data in the two memories is different. While this technique increases the reliability of the stored data, there are certain conditions in which even this type of a redundant system will not enable the determination of an error. It must, of course, be emphasized that, in a postage meter, it is essential that the highest degree of reliability of the accounting data be obtained.

SUMMARY OF THE INVENTION

The present invention is therefore directed to the provision of an electronic postage meter having redundant memory in the nonvolatile accounting memory wherein the possibility of error conditions that are not detectable is minimized.

Briefly stated, in accordance with one aspect of the invention, redundant nonvolatile memories are provided in the accounting unit of an electronic postage meter, the accounting unit having a microprocessor controlled to store accounting data redundantly in the two memories. In order to minimize the possibility of nondetectable errors, the two redundant memories are interconnected with the microprocessor, i.e., the microcomputer bus, by way of entirely separate groups of data and address lines. As a result of the complete separation of the addressing and data, various error conditions, such as the shorting of a pair of address lines, will not result in the erroneous addressing of both of the memories. Accordingly, under such conditions, the shorting of a pair of address lines will not result in the storage of the same data in both of the memories, so that a comparison of stored data will result in the detection of the error condition.

In accordance with a further embodiment of the invention, corresponding data is applied redundantly to the redundant memories at different times. This may be effected by separately applying the data sequentially to the two memories. Alternatively, data may be simultaneously applied to or retrieved from the two memories, with the data transferred at any instant with respect to the two memories corresponding to different information. As a result, instantaneously occurring transients on the transmission lines will not be likely to affect the corresponding data stored in the two memories in the same fashion. This system thereby minimizes the possibility of nondetectable and/or noncorrectable errors resulting from transients.

In accordance with a still further embodiment of the invention, the redundancy of the accounting system may be increased by also employing redundant microprocessors for controlling the two memories.

In order to still further minimize the possibility of printing postage without accounting, the program of the microprocessor may be directed to the periodic testing of various critical parameters within the microprocessor, as part of a main routine, the testing routine only being interrupted, if necessary, during a conventional postage printing operation such as the printing of postage and accounting therefor. As a consequence, the routine of the postage meter enables the continuous testing of such parameters, so that the postage meter may be disabled as soon as a condition exists that threatens the integrity of the accounting data. The error checking on a periodic basis may test not only the physical parameters, such as positions of various mechanical elements, but also may effect the comparison of the data stored in the two memories, as well as performing control sum checks to determine if the data stored in each memory is in accordance with determined relationships.

BRIEF DESCRIPTION OF THE DRAWINGS

In order that the invention will be more clearly understood, it will now be disclosed in greater detail with reference to the accompanying drawings, wherein.

DESCRIPTION OF THE PREFERRED EMBODIMENTS

Figure 1:
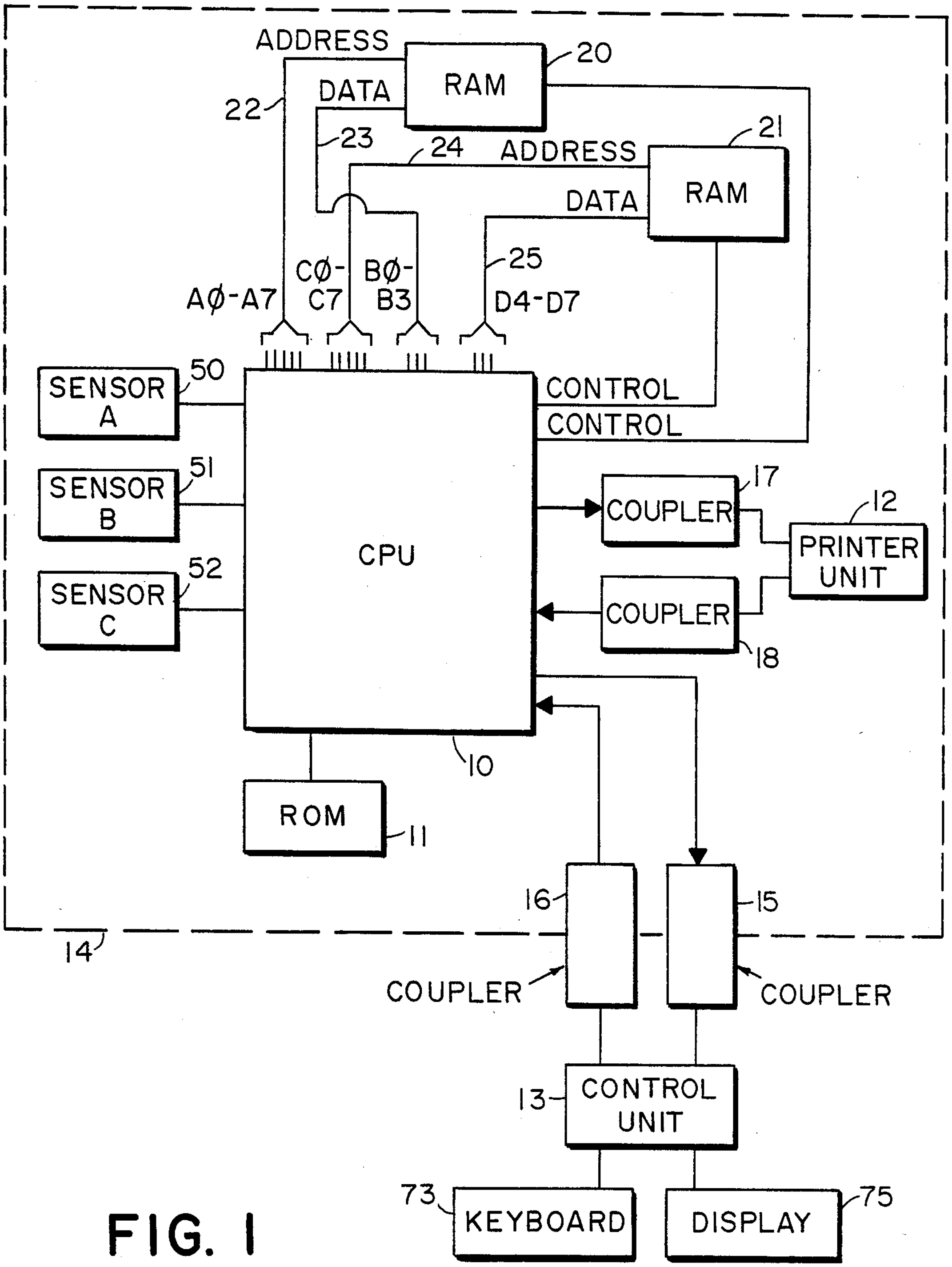
FIG. 1 is a block diagram of one embodiment of an electronic postage meter in accordance with the invention.

Referring now to the drawings, and more in particular to FIG. 1, therein is illustrated an electronic accounting system, such as may be employed in an electronic postage meter. The system incorporates a central processing unit 10, such as a microprocessor, and a read only memory 11 storing programs for operation of the system. The central processing unit 10 is coupled to one or more peripherals, such as, for example, the printing unit 12 and control unit 13 of an electronic postage meter such as disclosed in U.S. Pat. No. 4,301,507. In the system of FIG. 1 a secured housing 14 surrounds various components of the system, such as the central processing unit 10 and printing unit 12. As a consequence, it is necessary to provide ports between the central processing unit and external control unit 13, in order to enable two-way communication between these units. Preferably, the ports are in the form of a pair of one-way tranmission paths with opto couplers 15 and 16 at the secure housing, in order to inhibit the application of any electric potentials to the accounting unit without showing evidence of attempts to damage the unit. The opto couplers preferably provide for two-way serial intercommunication between the units on a bit-by-bit basis, in order to minimize the number of ports necessary in the housing.

In addition, it is desirable, as discussed in aforementioned U.S. Pat. No. 4,301,507 to enable intercommunication between the printing unit and central processing unit 10 by way of a similar pair of opto coupling devices 17 and 18, these opto couplers preferably enabling serial two-way transmission on a bit-by-bit basis.

The printing unit, as well as the control unit may, if desired, have separate microprocessors incorporated therein, enabling the use of a plurality of dedicated microprocessor systems. This not only enhances the security of the system, but also increases its reliability by restricting the required tasks of each microprocessor to a specific portion of the overall operation of the system. For example, the possibility of conflicting program requirement is thereby greatly reduced.

As illustrated in FIG. 1, a pair of random access memories 20, 21 is also provided within the secure housing. The random access memories 20 and 21 are preferably nonvolatile memories of conventional nature, so that accounting data may be stored therein without loss even though external power to the system may be lost. For example only, the random access memories may be of the type employing battery back-up, EAROM or EEPROM.

In accordance with the invention, the random access memory 20 is connected to the central processing unit 10 by way of a plurality of address lines 22 and a plurality of data lines 23. The random access memory is coupled to the central processing unit 10 by way of another plurality of address lines 24, and another plurality of data lines 25. In accordance with the invention it is necessary that both the address lines and the data lines coupled to the random access memories be different. For example, address lines A0–A7 are of a conventional microprocessor system and may be coupled to the random access memory 20, while address lines C0–C7 are coupled to the random access memory 21. Similarly, conventional data lines B0–B3 may be coupled to the random access memory 20, with data lines D4–D7 being coupled to the random access memory 21.

In an accounting system that requires both security and reliability, it is desirable to provide redundancy. A certain degree of redundancy may be obtained if the random access memories are connected to the central processing unit by separate data lines, although employing the same address lines. In such a system, the same data may be stored or retrieved from the two random access memories by way of their respective separate data lines, either simultaneously or at different times under control of the respective chip enable signals. While in many instances such an arrangement will enable the detection of errors, upon comparison of data in the two memories, there are in fact possibilities of error that cannot be detected. For example, if two of the address lines are inadvertently shorted together, either in the microprocessor itself or externally thereof, the same erroneous data will be stored in the two random access memories, so that comparison of the data stored in the two memories will not reveal an error condition.

The present invention overcomes this problem by employing an entirely different set of address lines of the address bus for addressing the two random access memories. Preferably, of course, the number of address lines, and the number of data lines, connected to each of the random access memories is the same. If, now, two address lines of the system are shorted together, for example, there is little likelihood that the resultant data stored in the two memories will be the same, so that the reliability of the system, in detection of errors, is greatly increased.

Figure 2:
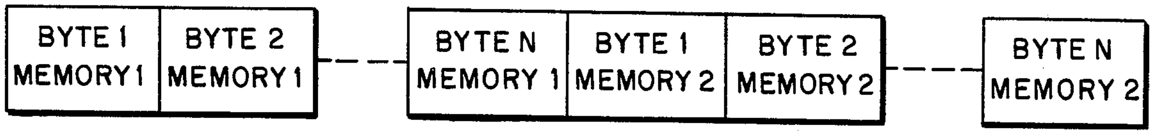
FIG. 2 is a time diagram illustrating the sequence of addressing the redundant memories in accordance with another embodiment of the invention.

While the two random access memories may be simultaneously addressed, employing their separate address lines, for the storage or recovery of the same information, this may also result in errors that could not be detectable or connectable. For example, it is possible that a transient on the bus lines could interfere, in the same manner, with the simultaneously transmitted data. Accordingly, in accordance with a further feature of the invention, as illustrated in FIG. 2, the two memories are addressed, with respect to the same data, in a sequential manner. For example, all of the sequential bytes of a message may be first applied to, or received, from the first memory, i.e., memory 1. Following the transfer of this message, with respect to the first memory, the same message is then transmitted with respect to the second memory. It will, of course, be apparent that the term "byte" herein refers to data of a length equal to the number of data lines connected to each memory.

Figure 3:
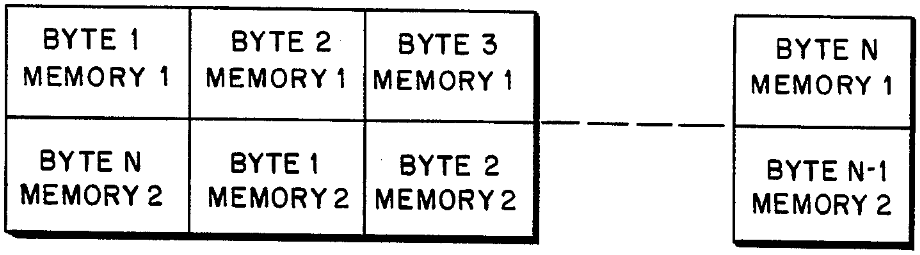
FIG. 3 is a time diagram illustrating another sequence for addressing the redundant memories in accordance with the invention.

In order to reduce the time necessary for updating or reading the memory, each memory may be updated or read simultaneously but with different data being transmitted to or from each memory at any instant, as illustrated in FIG. 3.

FIGS. 2 and 3 hence illustrate two techniques for minimizing the occurrence of undetectable errors resulting from the occurrence, for example, of transient pulses. It is apparent that it would be unlikely for the same interference to occur with sequentially transmitted data.

Figure 4:
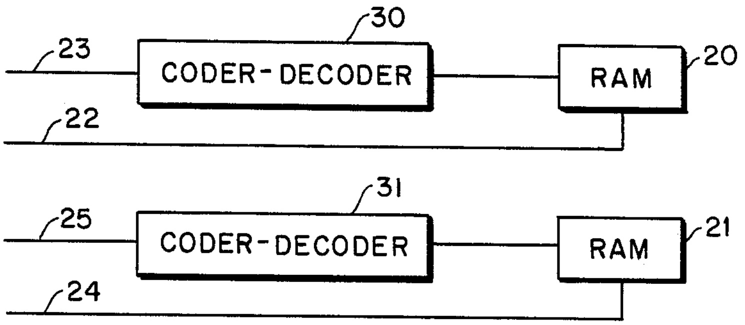
FIG. 4 is a block diagram of a portion of a modification of the system of FIG. 1.

In a still further embodiment of the invention, the data may be stored in the two memories in a different form. For example, the data stored in one or both of the memories may be coded, in order to further minimize the occurrence of errors undetectable by comparison of the data stored in the two memories. For example, as illustrated in FIG. 4, a coder/decoder 30 may be employed to code and decode the data stored in the random access memory 20, applied to and received from the data bus 23. A coder/decoder 31 may optionally be provided for coding and decoding data in the random access memory 21. If such an additional coder/decoder is employed, it is preferably that it have a different coding than that of the coder/decoder 30.

It is, of course, apparent that the programs of the microprocessor have appropriate subroutines to determine, when a comparison between the data shows an inconsistency, which memory bears the greater likelihood of correctness. In addition, further routines may be provided in the event of an inability of the system to determine which of the data entries are error free, to provide an error indication that inhibits further operation of the system.

In the embodiment of the invention illustrated in FIGS. 2 and 3, the two memories are addressed under the control of a fixed program responsive, for example, to a determined condition in the system. As a consequence, a determined relationship necessarily exists between the addressing times for the two memories. As a further modification, when separate memory units are provided, each memory unit may be made independently responsive to determined conditions. For example, when the accounting system is interconnected as illustrated in FIG. 1 to form a postage meter, the two memories may be independently responsive to each feedback of a printer setting, in order to update the separate memories, with an overriding subroutine being provided for cross-checking, i.e., comparing the data stored in the two memories. The independent control may be, for example, in the form of a memory controller. By thus making the two memory units operable more independently from one another, the chances of a greater error-free operation are substantially enhanced.

In order to insure proper operation, and thereby to maintain the integrity of the accounting information stored therein, electronic postage meters are provided with a plurality of sensors, such as the sensors 50, 51 and 52 illustrated coupled to the central processing unit 10 in FIG. 1. These sensors may be employed for checking a number of conditions within the meter, such as the position of a shutter bar blocking operation of the meter, the positions of various interposers controlling operation of the postage meter, and various other condition sensors such as temperature and humidity. In nonelectronic postage meters of the type employing microprocessors for control, such as disclosed in U.S. Pat. No. 3,978,457, certain of these sensors are interrogated by a software routine upon the initial application of power to the meter. The positions of the various shutter bars and interposers, for example only, are also determined by software routines initiated by various externally originating conditions, such as, for example, manually controlled operations for initiating the printing of postage. The error checking routines for checking such sensors, as well as for checking additional conditions such as the correctness of data stored in the memories, are hence invoked only when specifically requested in response to external stimuli. Thus, even though a condition may have occurred between operations of the postage meter, that would eventually cause it to cease operation, i.e., upon the next call for printing of postage the meter may still deceptively appear externally to be operable.

In accordance with a further feature of the invention, a program for the microprocessor effects the checking of the registers of the random access memory, as well as the various sensors, which may be optical switches, and all other critical data indicators at regular times during the course of operation of the postal meter, rather than simply checking these parameters at startup of the meter and uncalled for by external stimuli. By thus providing periodic checks, the possibility of error-free operation is even more greatly enhanced. In other words, the main routine of the postage meter, to which it always returns following the completion of, for example, a postage printing operation, includes software subroutines that periodically check critical parameters, such as the proper positioning of mechanical elements in the meter and the correct comparison of data in memories, as well as the correctness of the data in accordance with control sum data. This technique enables the additional advantageous periodic checking of further sensors mounted, for example, to detect mechanical violation of the security of the housing.

Figure 5:
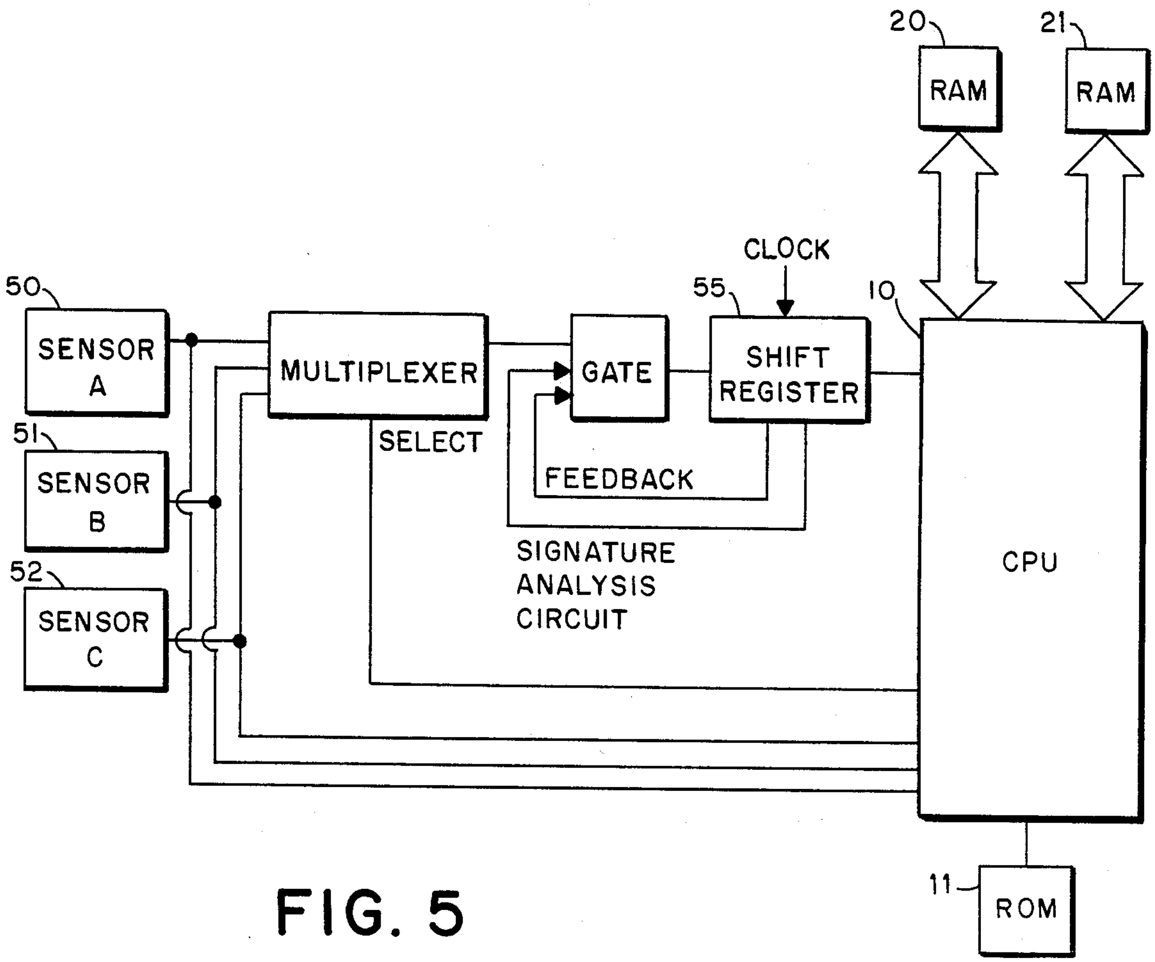
FIG. 5 a block diagram of a further modification of a portion of the system of FIG. 1.

For this purpose, as illustrated in FIG. 5, the sensors 50, 51 and 52 may be connected to set a plurality of stages of a shift register 55. It will, of course, be understood that the number of such sensors may be greater than the three illustrated. The shift register 55 is coupled to the address and read out by the central processing unit 10 at determined times in the main program. A coded bit pattern is provided in the read only memory 11, corresponding to the correct error-free conditions of the sensors. At the times during the program when the sensors are to be tested, the shift register, under control of the central processing unit, shifts out the existing bit pattern for comparison with the stored bit pattern in the read only memory 11. Thus, the status of the various sensors in the meter may be continually determined, so that the meter may be disabled as soon as a condition exists that threatens the integrity of the meter.

The shift register may be, of course, shifted under the control of the microprocessor, by the conventional clock source in the system. Alternatively, the shift register may be preprogrammed, in accordance with a determined unique pattern, so that the output of the shift register may be compared with a predetermined "good" condition. The information available from an eight or 16 bit pattern code, in accordance with this embodiment of the invention, may thus provide a very large degree of sophistication for the determination of any appropriate error checking for diagnostic purposes, using signature analysis techniques. This form of error checking may be imposed upon various system constraints for both diagnostic and possible error correction on an automatic basis.

In the system illustrated in FIG. 1, as discussed above, the printing unit 12 and control unit 13 may include dedicated microprocessors for controlling the specific functions of these units, thereby enabling the use of a dedicated system for the accounting unit including the central processing unit 10, read only memory 11 and random access memories 20 and 21. In further embodiments of the invention, the printing unit 12 may further incorporate a random access memory 60, and/or the control unit 13 may include a nonvolatile random access memory 61.

Figure 6:
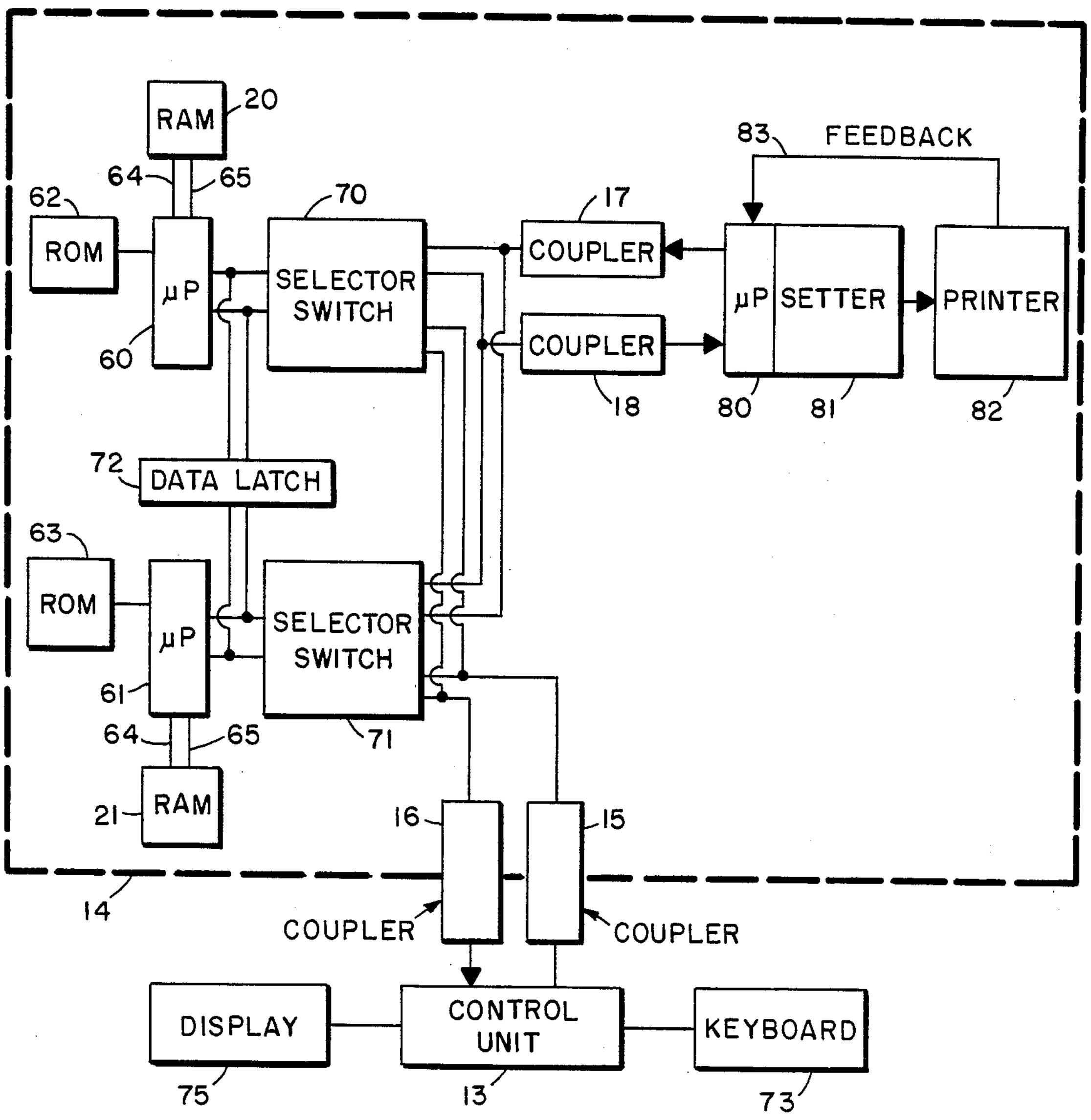
FIG. 6 is a block diagram of a further modification of the invention.

In a further embodiment of the invention, as illustrated in FIG. 6, the nonvolatile random access memories 20, 21 of the accounting system are intercoupled with separate microprocessors 60 and 61, each of the microprocessors having a separate read only memory 62, 63 respectively, for storing the operating programs for the respective microprocessor. It will, of course, be apparent in the arrangement of FIG. 6, as well as in the arrangement of FIG. 1, that the read only memory, as well as other components of the system, may be incorporated in the same integrated circuit as the microprocessor. Since the two microprocessors are separately controlled, and have separate address and data lines 64, 65 respectively, the two random access memories are thereby entirely independently controlled. The two microprocessors separately communicate with the control unit 13 and printer 12 by way of separate selecting switches 70 and 71 addressed by the respective microprocessors 60 and 61. As a consequence, each of the microprocessors may receive signals from the printer and control unit, and each of them may also transmit messages. In addition, data processed in the two microprocessors may be compared by means of a data latch 72 controllable by either of the microprocessors.

In the arrangement of FIG. 6, input data received, for example, from the keyboard 73 or other peripheral device coupled to the control unit 13, is applied by way of the opto couplers 15 and 16 and the selecting switches 70 and 71 to the two microprocessor systems. Alternatively, of course, the data may be input to the two microprocessors in response to an interrupt signal. The two microprocessors, in response to the input information, perform the necessary accounting procedures independently of one another, with respect to the data stored in the respective random access memories. The programs of the two microprocessors enable interchange of accounting data for comparison, for example, on a contention basis, by way of the data latch 72. The programs of the two microprocessors may enable, for example, only one of the microprocessors to control the display 75 coupled to the control unit 13, and/or to control the printer 12. Alternatively, of course, redundant control may be employed, whereby the control of a printer function, or the control of a display, may require the common occurrence of the output function from the two microprocessors. This may be effected, for example, in the manner disclosed in aforementioned U.S. Pat. No. 4,301,507, by controlling a pair of series transistors separately by the two microprocessors, whereby the common output of the series transistors effects the desired control. It is, of course, apparent that other techniques may be employed for this purpose.

The arrangement of FIG. 6 thereby increases the redundancy of the system, so that even a failure in a microprocessor will enable the determination, with great reliability, the occurrence of an error condition that may require the disabling of the meter.

In the system of FIG. 6, the printer 12 is more completely shown as comprised of a microprocessor 80 coupled to the opto couplers 17 and 18, and controlling a print setter 81. The print setter 81 sets the printwheels in a printer 82, the setting of the printwheels being fed back to the microprocessor 80 by way of a feedback path 83. This feedback enables the printer unit to determine if an error has occurred in the setting of the printwheels, and thereby to disable the meter in the event of an erroneous setting. The feedback setting may be applied from the microprocessor 80 to the opto couplers 17 and 18, thereby enabling the two microprocessors in the accounting system to be separately responsive to the feedback signals, for accounting for postage to be printed.

It is, of course, apparent that suitable control lines are provided connected to the microprocessor and random access memories, in the disclosed systems of the invention, in the conventional manner, for controlling the systems.

The function of disabling the meter, in the illustrated embodiments of the invention, may be effected by inhibiting, under program control, operation of the mechanical elements of the meter. Alternatively, the existence of an error requiring disabling of the meter may direct the routines of the microprocessor to perform an endless loop. Errors that do not require disabling of the meter may be displayed, under control of the microprocessor, by means of the display 73 coupled to the external control unit.

While the invention has been disclosed and described with reference to a limited number of embodiments, it will be apparent that variations and modifications may be made therein, and it is intended in the following claims to cover each such variation and modification as falls within the true spirit and scope of the invention. Other types of memory can, of course, be employed instead of RAM such as serial memory.

What is claimed is:

1. In an electronic postage meter having a microprocessor, memory means coupled to said microprocessor for storing postage accounting data and operational condition data, and a plurality of sensors for detecting operation conditions in said postage meter, the improvement wherein said microprocessor comprises means for checking said sensors periodically on a time-shared basis, said time sharing including at least verification of said stored accounting data, said checking being effected between successive operations of said meter by said microprocessor, said meter operation being in response to external operational inputs, comparing data, said microprocessor presenting in said means for comparing a unique pattern of said stored operational condition data for comparison with a pattern of actual operational condition data from said sensors, and means response to an absence of said unique pattern in the outputs of said sensors for indicating an error condition.

2. The electronic postage meter of claim 1 wherein said sensors are arranged to sense physical conditions of said meter.

3. The electronic postage meter of claim 1 wherein one of said sensors is arranged to sense the position of a shutter bar which blocks the operation of said meter.

4. The electronic postage meter of claim 1 wherein one of said sensors is connected to sense temperature.

5. The electronic postage meter of claim 1 wherein one of said sensors is connected to sense humidity.

6. The electronic postage meter of claim 1 wherein said postage meter has a memory, and said means for checking said sensors periodically checks the correctness of data stored in said memory.

7. The electronic postage meter of claim 1 having a pair of memories for storing postage meter data wherein said means for checking said sensors also periodically compares information stored in said memories.

8. The electronic postage meter of claim 1 wherein said meter operation is responsive to randomly timed external operational inputs.

* * * * *